United States Patent
Bellhy

(10) Patent No.: US 11,418,907 B2
(45) Date of Patent: Aug. 16, 2022

(54) SYSTEM FOR LOCATIONAL TRACKING AND COMPENSATION

(71) Applicant: GeoPay LLC, McDonald, PA (US)

(72) Inventor: Nathan David Bellhy, McDonald, PA (US)

(73) Assignee: Geopay LLC, McDonald, PA (US)

( * ) Notice: Subject to any disclaimer, the term of this patent is extended or adjusted under 35 U.S.C. 154(b) by 0 days.

(21) Appl. No.: 16/782,927

(22) Filed: Feb. 5, 2020

(65) Prior Publication Data
US 2020/0252743 A1 Aug. 6, 2020

Related U.S. Application Data

(60) Provisional application No. 62/801,436, filed on Feb. 5, 2019.

(51) Int. Cl.
*H04W 4/021* (2018.01)
*H04W 4/029* (2018.01)
*G06Q 30/02* (2012.01)

(52) U.S. Cl.
CPC ........ *H04W 4/021* (2013.01); *G06Q 30/0208* (2013.01); *G06Q 30/0226* (2013.01); *G06Q 30/0261* (2013.01); *H04W 4/029* (2018.02)

(58) Field of Classification Search
CPC .. H04W 1/021; H04W 4/029; G06Q 30/0261; G06Q 30/0226; G06Q 30/0208
See application file for complete search history.

(56) References Cited

U.S. PATENT DOCUMENTS

| | | | |
|---|---|---|---|
| 2013/0041761 A1* | 2/2013 | Voda | G06Q 30/0259 705/14.68 |
| 2014/0200983 A1* | 7/2014 | Bacastow | G06Q 20/36 705/14.28 |
| 2014/0365304 A1* | 12/2014 | Showers | G01S 5/0252 705/14.55 |
| 2019/0164081 A1* | 5/2019 | Deluca | H04W 4/021 |

* cited by examiner

*Primary Examiner* — Muthuswamy G Manoharan
(74) *Attorney, Agent, or Firm* — Metz Lewis Brodman Must O'Keefe LLC

(57) ABSTRACT

A system for providing tracking and compensating end users for time spent at a defined location is provided. The system includes a server in communication with a business user component of various modules, an end user component of various modules, and a database storing system specific information. The modules include event creation to define events by location, with geofencing or beacon(s), and location modules to communicate location of an end user device in relation to the event location. A compensation module is configured to generate timestamps for entry, exit, and continued attendance of the end user within the event location, and to award compensation to the end user based on such timestamps. Advertising and commerce modules allow advertising such as coupons to be created on the system, which an end user may purchase with awarded compensation. The system may also include social media aspects for further interaction among end users.

18 Claims, 6 Drawing Sheets

SYSTEM FOR LOCATIONAL TRACKING AND COMPENSATION

CLAIM OF PRIORITY

The present application claims priority to U.S. Provisional Application Ser. No. 62/801,436 filed on Feb. 5, 2019, the contents of which are incorporated herein by reference in its entirety.

FIELD OF THE INVENTION

The present invention relates generally to systems for tracking, compensating and incentivizing users for attendance at a specific location.

BACKGROUND

The ever-increasing use of smartphones with data connections and location determination capabilities has altered the way humans interact with one another, shop for goods, and consume media. Smartphones often include mechanisms, such as global positioning systems (GPS) receivers, that allow the devices to continually update location information.

Advertisers, communication applications, and employers have harnessed the implementation of location determination mechanisms for various purposes. In one example, advertisers utilize the locations of individuals within a population to target advertisements to those who are most likely to purchase or otherwise engage in the good or service being marketed. This may occur when the individual is nearby the target retailer or restaurant, which may be determined by geolocation or WiFi communicating with an individual's mobile device. However, such systems do not incentivize an individual to go to a particular location. Rather, they merely provide notification of what is nearby a person's current location. It also does not incentivize a person to stay for any length of time. Some events, such as collegiate sporting events or activities, allow people to "check-in" at an event showing they were present at some point, but people will often go merely to check in and do not stay for the duration of the event. This leads to less participation and involvement.

Similarly, some employers have used location services to ensure employees clock-in and clock-out of a shift at a pre-defined location. To accomplish this, location determination mechanisms may use a geofence to define a region in which a process, such as clocking into work, can be executed. However, this too may only provide incentive to show up at the end of a shift and may not take into account other activity throughout the shift. Many of the services described above are often unidirectional and do not allow for the integration of various services that are now capable on user devices.

What is needed is a system that not only incentivizes event attendance but also rewards a person for staying at the event.

SUMMARY

The present invention is directed to a system for tracking, rewarding and incentivizing end users' attendance at specific events based on a duration of time spent at the event. The system allows business users, such as organizations, businesses, public companies, sports teams, government agencies, non-profits and employers, to interact with end users in an event location by transmitting information which includes advertisements, marketing links, online marketplaces, and compensation opportunities.

The system enables business user organizers to create and define events occurring at predetermined locations for end users to attend. These events may be geographically defined by an event location, such as with a geofence or one or more beacons that may be detected by an end user. End users use the system, at least a portion of which may be downloadable to their mobile device, to find events. The system is configured to recognize when an end user is present at a designated event location with reference to the geofence or beacon(s) for a given event and track how long the end user remains at the event location. Compensation is accrued over time as the end user remains at the event location and may be awarded to the end user throughout attendance at the event or upon leaving the event location, based on the rule set corresponding to the particular event. Compensation may be any form of value, such as points, credits, tokens, or money in any currency or denomination. For instance, the end user may be awarded 100 points for every 15 minutes of event attendance, or $20 per hour, as a few non-limiting examples. The continued communication between the end user's device and the locational aspects of the system track entry, continued presence and exit from an event and compensation is awarded for duration of attendance. End users may also be awarded items for free to further incentivize attendance.

The system also enables business user vendors to create advertisements such as coupons or vouchers for products and services that may be "purchased" by end users within the system using the compensation they have accrued from attending events. These advertisements may be associated with particular events, organizations, or locations, though this is not necessary. The advertising may be tiered such that featured advertising is presented more prominently to the end user.

The system may also include ways for end users to search for events or advertisements, to find local events and ways to spend their compensation. It may also include social media aspects, such as an ability to find and interact with other end users through posts and feeds, which may be viewable through the system or through a linked social media account.

The system, together with its particular features and advantages, will become more apparent from the following detailed description and with reference to the appended drawings.

BRIEF DESCRIPTION OF THE DRAWINGS

A complete understanding of the present embodiments and the advantages and features thereof will be more readily understood by reference to the following detailed description when considered in conjunction with the accompanying drawings.

DETAILED DESCRIPTION

Figure 1:
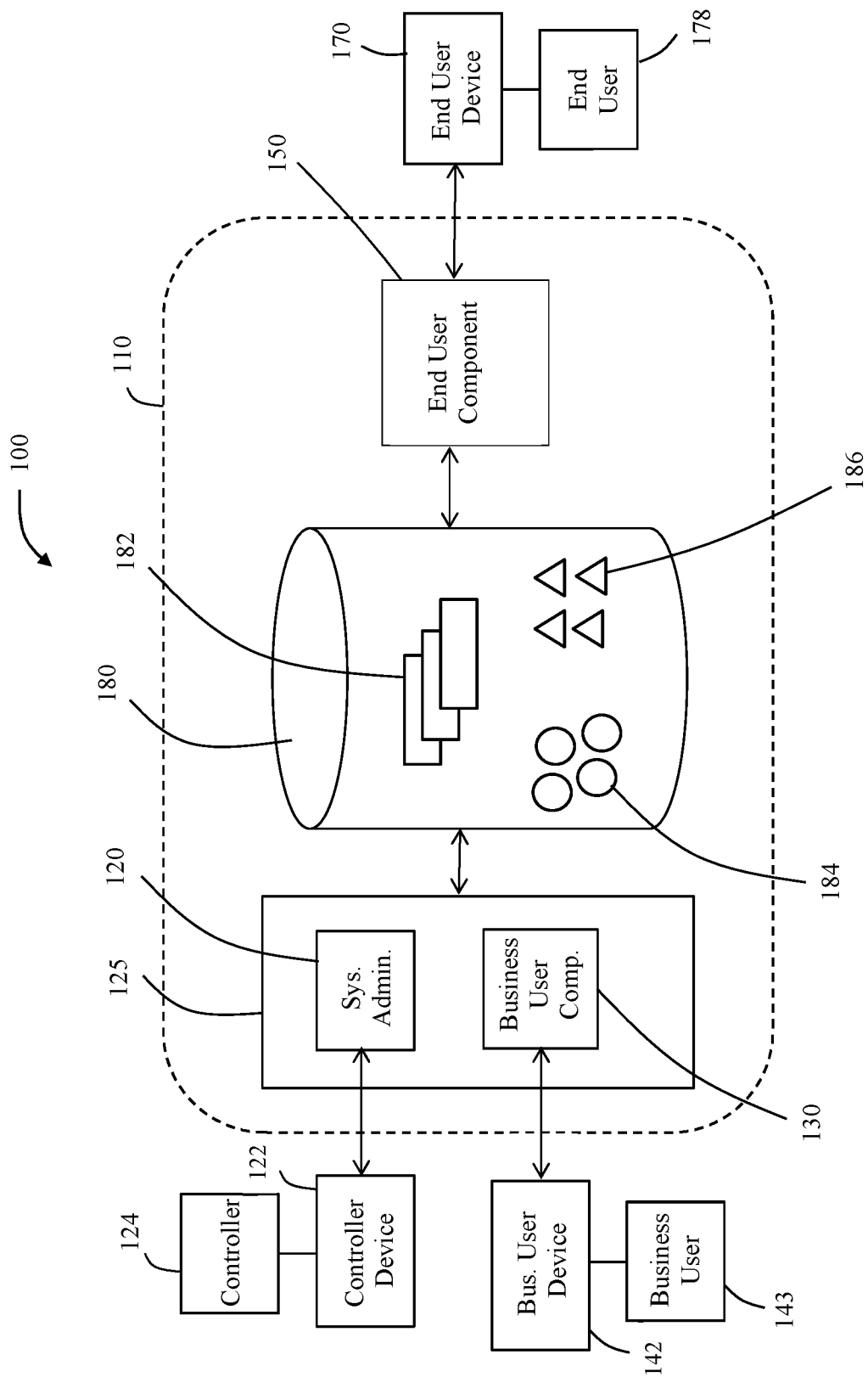
FIG. 1 is a diagram of the system of the present invention.

As shown in the accompanying drawings, the present invention is directed to a system for tracking, rewarding and incentivizing end users' attendance at specific events based on a duration of time spent at the event. End users are compensated for attendance by awarding units of value, such as credits, points, and/or money based on the amount of time the end user is logged as present at the event. Such compensation units may be used to purchase coupons or other promotional items associated with advertising from participating vendors. End users may also be awarded free items for certain events or achieving compensation milestones. The system therefore also contemplates incentivizing the end user to further participate by attending additional events.

In general, the embodiments described herein relate to a system 100 for defining a targeted event location 192 and transmitting information to computing devices 170 associated with end users 178 within the event location 192. The system 100 can be used by any business user 143, such as but not limited to employers, businesses, organizations, advertisers, marketers, or other groups and individuals, and by any end user 178. The system 100 can integrate third-party services including payment processing services, rewards services, advertising services, online marketplaces, and various other third-party services in communication with the system 100.

FIG. 1 illustrates an exemplary embodiment of the system 100 for tracking and rewarding attendance at events. The system 100 includes a server 110 configured to host various components, including a business user component 130, a system administrator component 120, a site 125, a database 180 and an end user component 150, as described further herein. The server 110 may be located anywhere, and preferably may be cloud-based for easy access by the various users of the system 100. For example, the server 110 may be associated with Amazon Web Services (AWS) or other similar cloud-based solution for remote access by users. The server 110 may also be located on or associated in electronic communication with any processors, hardware and software necessary to operate the server 110 and host and manage the remaining portions of the system 100 contained therein. For instance, a software module may reside in RAM, flash memory, ROM memory, EPROM memory, EEPROM memory, registers, a hard disk, a removable disk, a CD-ROM, or any other form of storage medium known in the art. An exemplary storage medium may be coupled to a processor, such that the processor can read information from, and write information to, the storage medium. In the alternative, the storage medium may be integral to the processor. Further, in some embodiments, the processor and the storage medium may reside in an application specific integrated circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions of the system 100 may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates the transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

The system 100 also includes a database 180 which preferably is stored on the server 110. As shown in FIG. 1, the database 180 receives and stores information relevant for the operation of the system 100, such as various events 182 that have been created for the purpose of rewarding attendance at such events, advertising 184 such as ads, promotions, coupons and vouchers for various participating vendors to be presented and redeemed through the system 100, user profiles 186 of the various users, such as business users 143 which may be organizations that organize and host events 182 or participating vendors that provide advertising 184, and end users 178 that use the system to attend events, receive compensation and advertising in connection with the event, and redeem compensation for coupons of participating vendors. The database 180 may have any hardware necessary to receive, store, operate and manage the various events 142, advertising 184 and profiles 186, such as but not limited to redis cache databases, postgrey (RDBMS), tables, and AWS S3 bucket to store multi-media files used in connection with the various events 142, advertising 184 and profiles 186.

Still referring to FIG. 1, the system 100 may further include a system administrator module 120 that is in electronic communication with the server 110 and configured to control the portions of the server 110 containing the system 100, including the database 180. The system administrator module 120 allows a controller 124 to access the system 100 to monitor and control various aspects of the system 100, such as user access, permissions, quality control, maintenance of the database 180, functions of server 110 or site 125 among others. The controller 124 may access the server 110 through a controller device 122 which may be any computing device such as a computer, laptop, tablet, or phone, though in at least one embodiment the controller device 122 is a computer having a processor, memory, input/output features such as a keyboard, mouse or touchpad, and a display. The controller 124 may access the system 100 through a site 125, which may be a website, portal or other similar digital location hosted on the server 110. Through the system administrator module 120, the controller 124 can establish, control, set and modify rules and parameters and view analytics data for system 100, including for the site 125, the business user component 130 and the end user component 150 and the various modules thereof. Controllers 124 can also authorize business users 143 and end users 178 to use the system 100 and can establish or modify the rules for end user compensation, advertising creation and redemption, such as described hereinafter.

The system 100 also includes a business user component 130 that is configured for business users 143 to create events 182 and content for end users 178. The business user component 130 may be software hosted on the server 110 and accessed on the site 125, which may be the same or a different site 125 from that which the controller 124 accesses the system administrator module 120. Business users 143 access the business user component 130 through a business user device 142, which may be any computing device such as those listed previously. In at least one embodiment, the business user device 142 is preferably a computer.

The business user 143 may be an organization, such as a business; non-profit; school; college; university; league of a particular focus, such as sports or gaming; interest group relating to a particular interest, such as music, concerts or hobbies; industry group; employer; collective; and co-op. These are but a few illustrative examples are not intended to be limiting in any way. These business users 143 may be referred to herein as "organizers" or "hosts," and the terms may be used interchangeably. Such organizers may use the system 100 to create events 182 for end users 178 to attend. Events 182 may be any event occurring at a particular place and time and may be a one-time event or recurring. Examples include, but are not limited to sports matches, classes, concerts, rallies, and even recurring employment. Organizers use the business user component 130 to create events 182, establish the parameters of events 182, and may set or select the compensation structure or rules for compensating end users 178 within the limits of what is previously established by the controller 124.

Business users 143 may also include vendors that sell products or services, such as but not limited to retail stores, restaurants and service providers. These business users 143 may be referred to as "vendors" herein. Vendors can use the system 100 to provide advertising 184 which may be presented to end users 178 while using the system 100. Advertising may include promotional material, coupons, discounts and vouchers which may be "purchased" in the system 100 by end users 178 with the compensation they accrue through use of the system 100.

The various business users 143 interact with the system 100 through the business user component 130, as depicted in FIG. 1. The business user component 130 may be software that is accessible through the site 125 and includes various business user modules 131 for the various functionalities or tasks that business users 143 can do through the system 100. For instance, and with reference to FIG. 2, the business user component 130 may include an account module 132 which allows the business user 143 to create an account and profile for itself. This may include login credentials, contact information, details of the organization or business, preferences, and other information specific to each business user 143. The account module 132 is presented to the business user 143 the first time they interact with the system 100 to establish and create an account. Once established, the account module 132 is also used by the business user 143 to login to the system 100 each time they want to access the system 100 or the business user component 130. Accordingly, in at least one embodiment, the account module 132 may require not only account creation but verification, such as through two-factor authentication, single sign in, one-time password, or other verification protocol. Verification may occur one time or every time the business user 143 accesses the system 100.

The business user component 130 also includes a subscription module 133 configured to provide and manage various possible subscription plans the business user 143 may purchase. In at least one embodiment, each business user 143 must subscribe to one of the subscription plans. The subscription plans may vary by type of business user 143. For instance, organizers may choose from plans that offer different numbers or types of events for different dollar amounts. The various plans may provide a different units of compensation per unit of time, with plans offering greater compensation per unit of time being more expensive than plans offering less. For example, some plans may offer events that award 100, 250 or 500 points per hour. In other examples, they may offer 10 credits per quarter of an hour, or 1 credit per minute. In still other embodiments, such as employment, the subscription plan may provide $20 per hour to employees or other hourly rate. Any type of compensation (such as but not limited to points, credits, tokens, rewards, goods and money) and any value unit or amount (such as but not limited to 1, 5, 10, 15, 20, 25, 50, 75, 100, 150, 200, 250, 300, 350, 400, 450, 500, 1000 and 5000) may be defined within the subscription plans for any increment of time (such as but not limited to 1 minute, 5 minutes, 10 minutes, 15 minutes, 20 minutes, 30 minutes, 1 hour, 1 day and 1 week), and any combinations thereof are contemplated within the invention. Plans may include at least one compensation type and value unit per time interval and may range up to any number of compensation units or increments thereof and any time interval. Payment may be handled through the system 100 or through a third party unaffiliated with the system 100.

The subscription module 133 may be configured to offer different plans to different types of business users 143. For example, vendors may select plans based on the number of advertisements 184 they want to provide, which may be featured or not as described below. Different plans cost different subscription amounts. For example, plans may be offered for a certain number of advertisements or coupons, such as at least one, and may be a plurality advertisements or coupons, with plans that provide more advertisements costing more to subscribe, although economies of scale may be realized for greater numbers of advertisements. As used herein, "advertisements" include not just ads or promotional items presented to the end user but also coupons, discounts and vouchers relating to products and/or services that may be "purchased" with compensation earned by end users 178 while using the system 100. Subscriptions for certain types of advertising may cost different amounts, such as featured advertising plans costing more than regular advertising plans. The parameters of various plans are established by the system administrator module 120 and the organizer business user 143 chooses from available plans presented to them through their user interface once they have an account established. Payment may be handled through the system 100 or through a third party unaffiliated with the system 100.

Once a business user 143 has established an account and selected a subscription, they can then use the remainder of the system 100. The business user component 130 also includes a group creation module 134 which organization business users 143 can use to define groups. For instance, the group creation module 134 may include a private group module 135 in which a private group may be defined as only certain individuals, such as employees of a company or students of a university. These individuals may be identified by any known method, such as by their email address. All members of a group may have the same domain name in their email address. To define a group, the organizer business user 143 inputs the group members' identifying information, such as with individual names, phone numbers, email addresses or a file such as a CSV file having composite information identifying multiple people. The organizer then names the group. If this group is selected for participation in an event 182, only those members of the group will be capable of being recognized by the system 100 as present at the event 182 for compensation for their attendance. The organizer business user 143 can also use the group creation module 134 to edit group members and delete groups they previously created.

Figure 6:
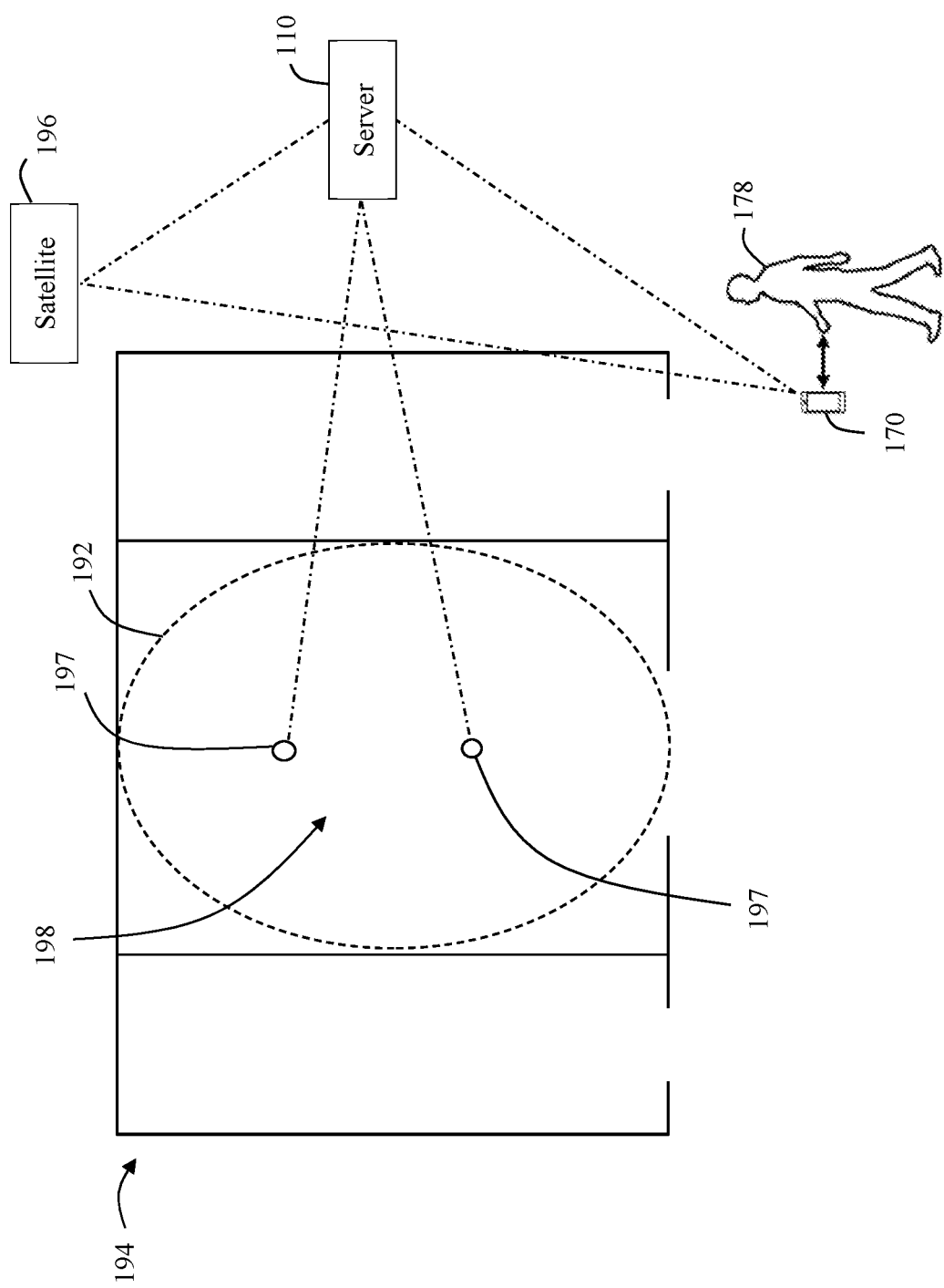
FIG. 6 is a schematic diagram of a second embodiment of an event location, as defined by beacons.

The group creation module 134 can also include a beacon group module 136 that is configured to collectively define a plurality of beacons so they act together to define an event region 190. As will be discussed in greater detail below, beacons 197 may be physically set up at locations for events 182. They can be linked together to define group to cover larger areas than a single beacon 197 would be able to cover. Beacons 197 may be in any form, such as but not limited to USB plug in, discs and cards. An organizer business user 143 may choose the particular type and number of beacons 197 based on the distance and size that fits their needs. The group creation module 134 is configured to create a unique identifier that is specific to each business user 143. These unique identifiers may be alphanumeric combinations and may be at least 8, 10, 12, 21 characters or longer. The group creation module 134 is also configured to generate major and minor IDs specific to a defined beacon group. The business user 143 can then configure the beacons 197 with the unique identifier and major and minor IDs, such as by inputting this information in the beacon 197 manufacturer's management app, to associate the beacons 197 together in a beacon group 198, such as depicted in FIG. 6, and get them to work collectively. The beacon group 198 can be named and stored in the group creation module 134. Any number of beacons 197 may be associated in a beacon group 198.

The business user component 130 also includes an event creation module 137 which organizer business users 143 will have permissions to use to create events 182. An event 182 may be created and defined by its parameters, including but not limited to: the date of the event 182; times the event 182 window will be open for attendance and/or compensation; a description of the event 182 and/or its purpose; photos for promoting the event 182 and/or organizer, documents that may be associated with or used during the event 182; whether the event 182 is recurring or single occurrence; the minimum or maximum number of attendees, if applicable; whether the event 182 is public (open to anyone or any end user 178 of the system 100) or private (only available to certain attendees, such as any end user 178 specific to an organization like a school or employees of a particular employer); and compensation scheme, which may be determined by the subscription plan purchased by the organizer. Events 182 may be defined by any or all of these characteristics, though at a minimum, events 182 may be defined by a date, time frame and location.

As part of the event creation module 137, the organizer will select the location and type of location for the event 182. An event location 192 is the area or zone where the event 182 will be held. An end user's 178 presence detected within the boundaries of the defined event location 192 will be considered as present or attending the event 182 and will result in the end user 178 receiving compensation based on the duration of time spent at the event 182, according to the rules established by the system administrator 120 and corresponding to the subscription plan selected by the organizer of the event 182. When the end user's 178 presence inside the event location 192 is not detected, this corresponds to a determination that the end user 178 is not attending or no longer attending the event 182, and no further compensation will be awarded.

Figure 5:
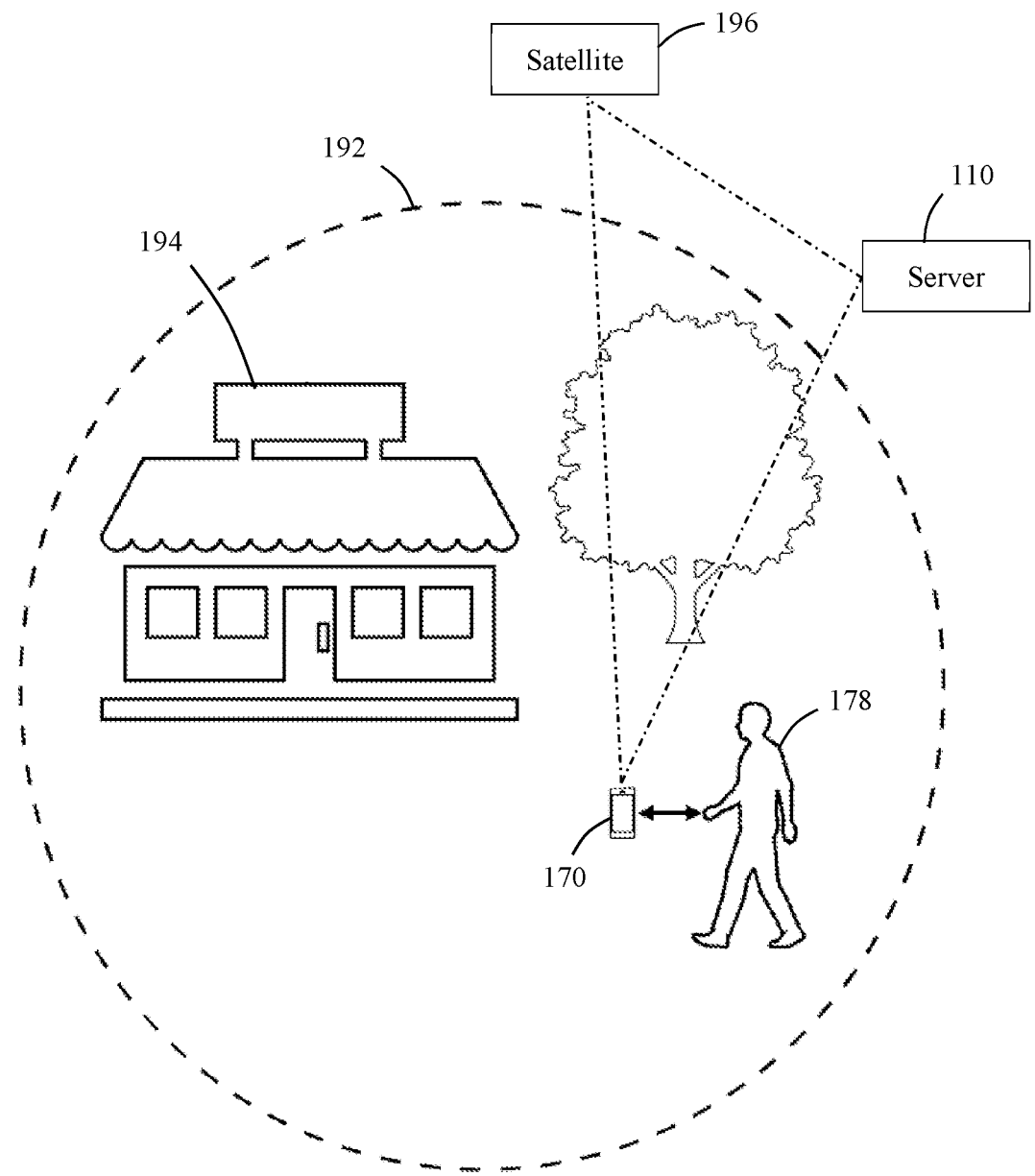
FIG. 5 is a schematic diagram of one embodiment of an event location, as defined by a geofence.

The event creation module 137 therefore also includes capabilities to select the type of location for the event 182. For instance, the event creation module 137 may include a geofencing module 138 that is configured to establish and recognize a location based on a geofence. The geofence establishes an event location 192 as the area within a geofence, having a radius from a selected central point such as a structure 194 like a building or stadium, as depicted in FIG. 5. The geofence radius may be any size but in at least one embodiment is at least 50 meters from the designated center. The central point of the geofence may be selected by the organizer business user 143 by inputting an address, latitude and longitude coordinates, or selecting a point on a map, for instance. The desired radius for the geofence can then be designated, either by inputting the desired value or dragging a perimeter of the geofence depicted on a map to the size desired. Accordingly, in at least one embodiment, the geofencing module 138 may include mapping features that an organizer can interact with through the graphical user interface of the organizers' device 142. Geofencing may be used with geolocation methods using satellite(s) 196 and the GPS of an end user's device 170 to determine when an end user 178 is present within and when they exit a geofence-designated event location 192, as shown in FIG. 5.

Referring again to FIG. 2, the event creation module 137 may also include a beacon module 139 that is configured to establish and/or recognize beacon(s) 197 for defining the location of an event 182. Beacons 197 can be used to define event locations 192 of a size smaller than geofences, which may be defined as the transmission zone of the beacon 197 which may be as little as 1 meter or more depending on the manufacturer's specifications of the beacon 197. Accordingly, beacons 197 may be used to define an event location 192 that is a single room or collection of rooms within a single story of a building, or a portion of a structure. Beacons 197 may use Bluetooth, WiFi or other near-field connection method to detect the presence of an end user 178 in relation to a beacon-designated event location 192, as shown in FIG. 6. In establishing an event 182 as a beacon-designated event, the organizer business user 143 selects the beacon 197 or beacon group 198 previously established and identified in the system 100.

Once an event is created, its date, time, location, type of event (geofence or beacon) and other associated information are stored as an event 182 file within the database 180 in the system 100 for reference when end users 178 attend the event 182.

Figure 2:
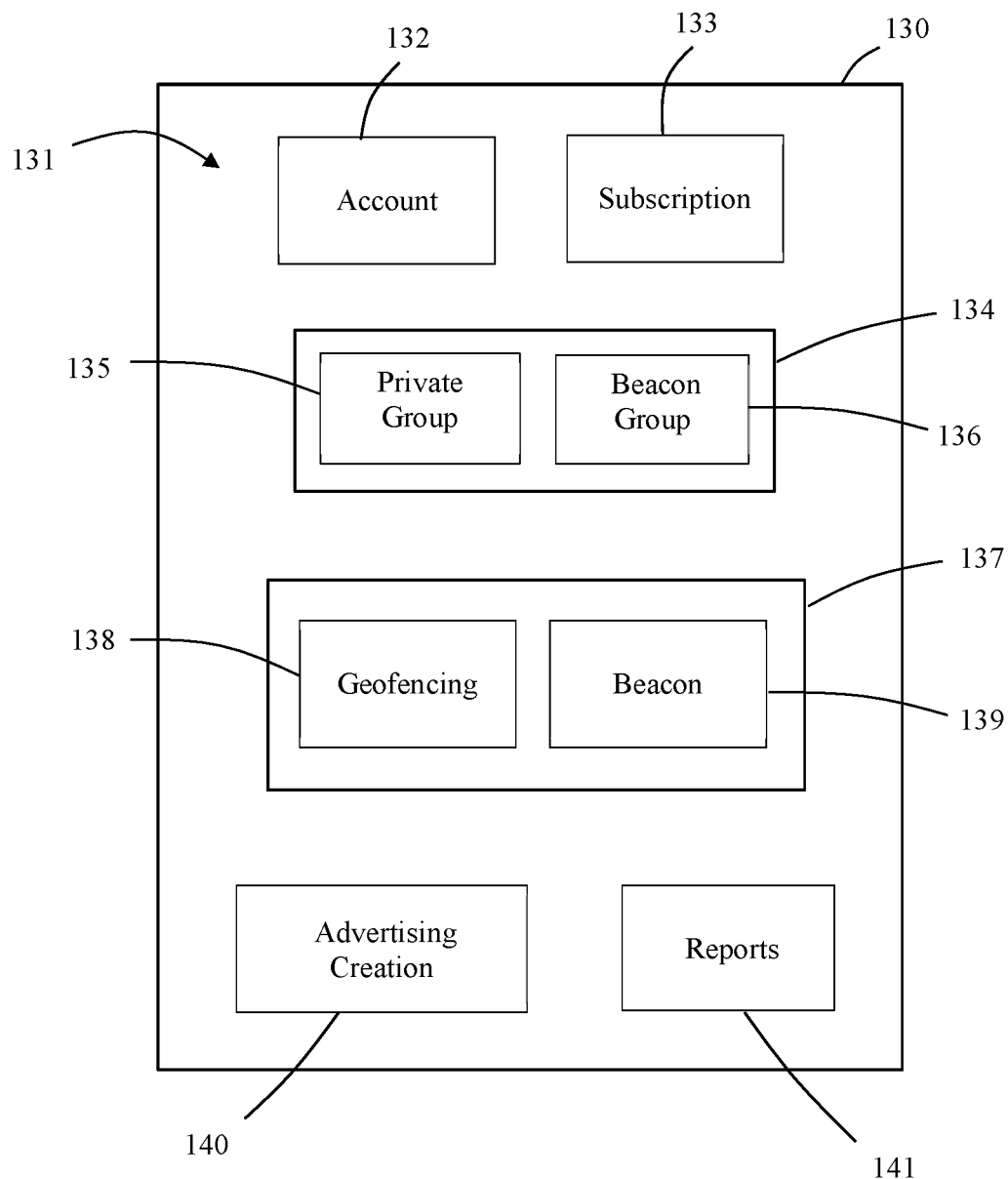
FIG. 2 is a diagram of illustrative modules of the business user component of the present system.

As seen in FIG. 2, the business user component 130 also includes an advertising creation module 140 to be used by vendors. Vendors do not create events, but rather use the account module 132 to create an account and the subscription module 133 to select an appropriate vendor subscription, as described above. Once this has been done, the vendor can use the advertising creation module 140 to create advertising for end users 178 to view and engage with. The advertising creation module 149 is configured to allow vendors to create advertisements 184 such as promotional materials, coupons, discounts and vouchers for the vendor's products or services that can be presented to end users 178 while they use the system 100 and purchased in the system 100 with the compensation they earn from attending events 182. When creating an advertisement 184, the vendor provides the relevant details, such as but not limited to: what products or services it is for; the redemption amount which corresponds to how much earned compensation may be required to "purchase" the advertisement 184, an expiration date, if applicable; where it can be redeemed (online or offline at particular physical locations, store or branches); any exclusions or black-out periods that apply; and identification, such as a code or name, so it can be distinguished from other advertisements from the same or other vendors. In addition, the advertisement may be designated as a "featured" or "regular" advertisement. The default subscription allows vendors to create advertisements 184 as normal, which may be presented to the end user 178 when they are near to an associated event location 192 or based on what is near the end user's 178 location. If a vendor has a higher-value subscription, they may be able to create featured advertisements which may be presented in higher priority to the end user 178, such as at the top of the display 171 of the end user device 170 used by an end user 178, or may be presented first or on a rolling basis with other featured advertisements. The vendor may designate an advertisement 184 as regular or featured as allowed by the advertising creation module 140 pursuant to their subscription. All advertisements 184 may be stored in the database 190 once created and until they are redeemed for products or services, and may be associated with a particular event 182, event location 192, structure 194 or other geographic region.

The business user component 130 also includes a report module 141 configured to generate reports for the business user 143 depending on what type of business user they are. For instance, the report module 141 may generate reports of event attendance, such as the number of end users 178 that attended the specific event 182, the amount of time spent by each end user 178 at the event 182, and can be provided for specific events 182 or all events for a specific organizer business user 143. The report module 141 may also generate reports of advertisements 184 created for each vendor, the number of times the advertisement 184 was viewed, the number and identification of advertisements 184 such as coupons obtained or purchased through the system 100, and the number and identification of advertisements 184 such as coupons that have been redeemed for products or services, either online or offline. Accordingly, the report module 141 may be configured to track end user 178 activity, or coordinate with analytics software that performs such tracking, and preferably may track and/or report such data anonymously or pseudonymously so the end users 178 may not be identified. In at least one embodiment, the report module 141 may be configured to generate reports that identify end users 178 for attendance purposes, such as but not limited to for classroom or training sessions. The report module 141 may be configured to provide such reports in any relevant format, such as in tables, spreadsheets, CSV or Excel format, or dashboard presentation for real-time viewing of analytics information as part of the business user component 130.

Figure 4:
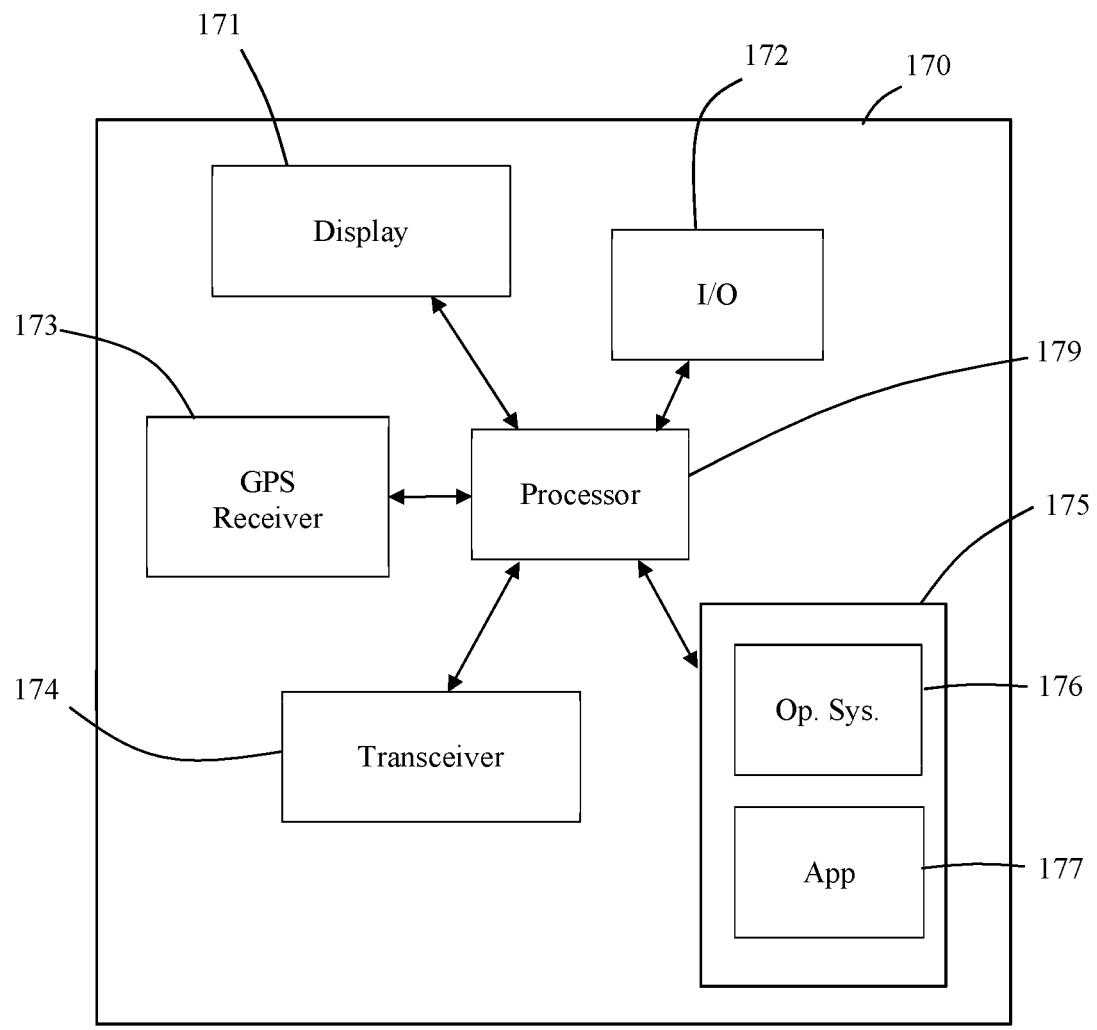
FIG. 4 is a diagram of an exemplary end user computing device.

As depicted in FIG. 1, the system 100 also includes an end user component 150 that may be hosted on the server 110 and which includes a variety of end user modules 151 through which an end user 178 may interact with the system 100 to earn compensation for attending events 182 and purchase advertisements 184 such as coupons with such compensation. As seen in FIGS. 1 and 4, the end user component 150 may be an application program 177, such as software that is downloaded onto an end user device 170 operated by the end user 178, such as a mobile device like a phone, smart phone or tablet, though any computing device may be used. Accordingly, the end user component 150 on the server 110 may be mirrored or coordinated with corresponding components of an application program 177 downloaded on an end user's device 170 for use of the system 100. The application program 177 may therefore use a graphical user interface (GUI) to present the end user component 150 of the system 100 to the end user 178 and enable interaction therewith.

Accordingly, and as shown in FIG. 4, the end user device 170 used by the end user 178 may have memory 175, which may be random access memory (RAM), flash memory, or another type of memory. The memory 175 may be configured to store an operating system (OS) 176 as well as the application program 177 mentioned above. In certain examples, the application program 177 may include instructions to implement passive and/or active dynamic geofencing, by retrieving and monitoring geofences as necessary based on location information.

The end user device 170 may also include a processor 179 configured to receive, process and provide instructions to the various components of the end user device 170 for operation and control of the same. The processor 179 may be any of a variety of different types of commercially available processors suitable for mobile devices, such as but not limited to an XScale architecture microprocessor, a microprocessor without interlocked pipeline stages (MIPS) architecture processor, or another type of processor. The processor 179 may be in electronic communication, either directly or via appropriate intermediary hardware, to a display 171 and to one or more input/output (I/O) devices 172, such as a keypad, a touch panel, microphone, speaker and the like. Similarly, in some embodiments, the processor 179 may be in electronic communication with a transceiver 174 that interfaces with an antenna of the end user device 170. The transceiver 174 may be configured to both transmit and receive cellular network signals, wireless data signals, or other types of signals via the antenna, depending on the nature of the end user device 170. In this manner, the connection with the server 110 (shown in FIG. 1) may be established. Further, in some configurations, a GPS receiver 173 may also make use of the antenna to receive GPS signals. Accordingly, the GPS receiver 173 and transceiver 174 may be used in connection with the GPS capabilities present on the end user device 170, such as the positional or locational hardware or software on the end user device 170, to enable and facilitate geolocation of the end user device 170 with respect to maps and other positional or location software, such as but not limited to Google maps.

As indicated above, the application program 177 may be software in the form of an app such as may be downloadable from the server 110 onto the end user device 170 of an end user 178. It may be of any suitable format, including but not limited to iOS and Android. The application program 177 may be viewable on the display 171 of the device 170 and the end user 178 may interact with the program 177 through the I/O component(s) 172 of the device 170, such as a keyboard or touchscreen. In at least one embodiment, the program 177 may have the same end user components 150 located on the server 110. In at least one other embodiment, the program 177 accesses the end user components 150 from the server 110 which remain on the server 110 during use, allowing the application program 177 to be smaller and require less power to run on the device 170.

Figure 3:
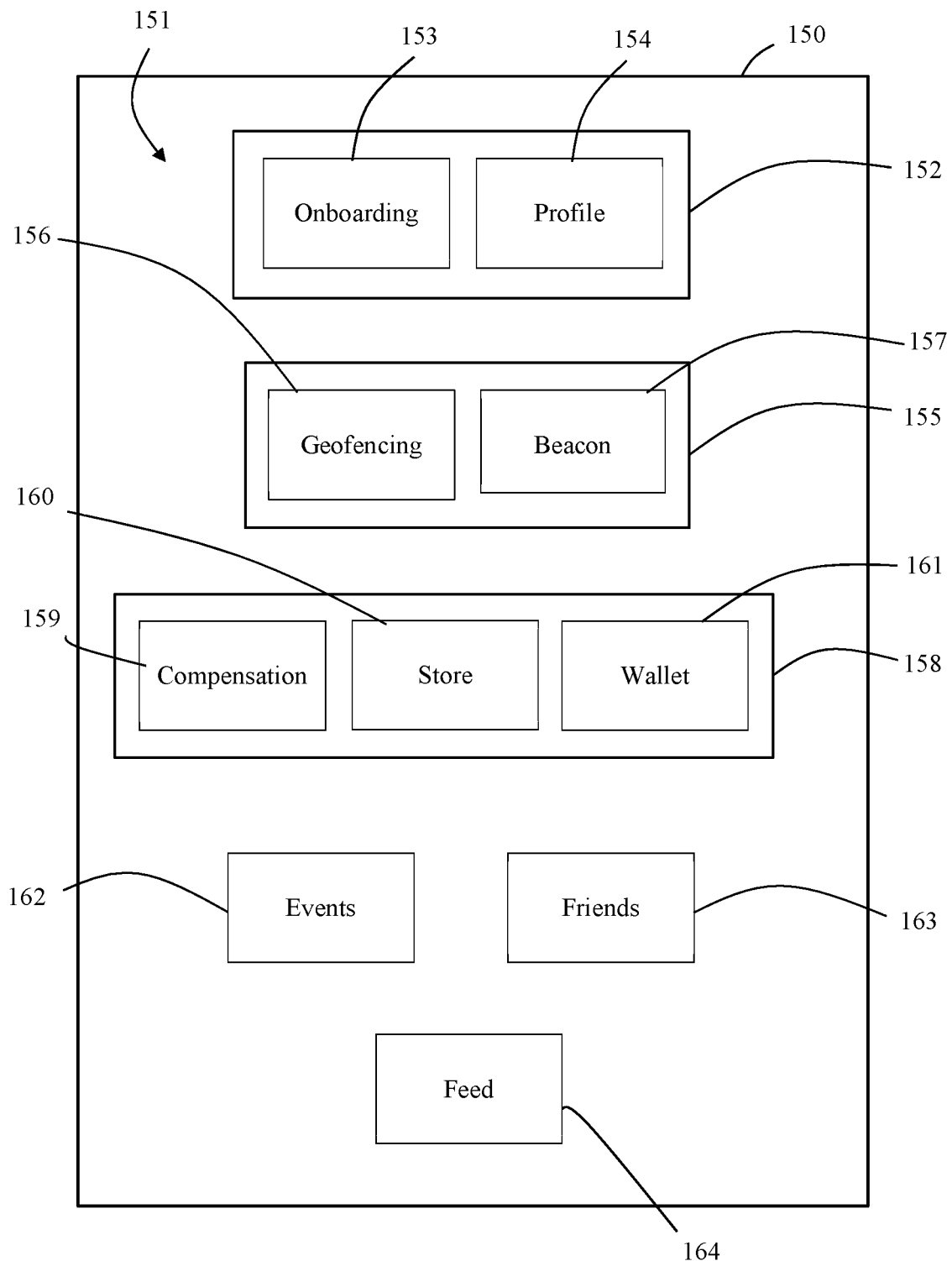
FIG. 3 is a diagram of illustrative modules of the end user component of the present system.

Regardless of whether they are included in the application program 177 that is downloaded on the end user device 170 or if they remain hosted on the server 110 and are accessed remotely, the end user component 150 provides various end user modules 151 which provide the functionality of the end user aspects of the system 100. These are shown in FIG. 3. At least some of these end user modules 151 may be presented on the display 171 of the end user device 170, such as through a graphical user interface (GUI) in the form of tabs, buttons or pages of the application program 177. Each of the end user modules 151 are in electronic communication with the processor 179 of the end user device 170 for processing and interaction by the end user 178.

For instance, as seen in FIG. 3, the end user component 170 may include a management module 152 that includes an onboarding module 153 and a profile module 154. The onboarding module 153 is configured to launch the first time the end user 178 engages the system 100, such as by opening the application program 177 downloaded on the end user device. The onboarding module 153 is configured to prompt the end user 178 to create an account with at least two end user identifiers, such as email address and phone number. Both end user identifiers are required to identify the end user 178 so that an end user 178 cannot simply create multiple fake email accounts in an attempt to gain extra compensation. The multiple end user identifiers enable the system 100 to reduce the likelihood of fake accounts. The onboarding module 153 also prompts the end user 178 to create a username and password to associate with the account for login credentials. The end user 178 can then subsequently sign-in to the system 100 using the predefined login credentials stored in the onboarding module 153. The onboarding module 153 may also require verification or authentication on sign-in, such as with two-factor authentication, single sign on or one-time-password (OTP) process. In some embodiments, the onboarding module 153 may be configured to link to and use social media platforms for sign-in or login processes, such as but not limited to Facebook and Google.

The management module 152 also includes a profile module 154 that is configured to store the end user's account information, including end user identifiers and login information. It may also be configured to store additional information specific to the end user 178, such as their favorite locations, and allow the end user 178 to manage their notifications through the system 100, such as when they receive notices of events which may be pushed to the end user 178 on a rolling basis, scheduled such as once per day/week, or only when logged in. The profile module 154 will also allow the end user 178 to set their profile as public (in which their activity and use of the system 100 will be viewable to all other users of the system 100) or private (in which their activity and use will be visible only to the end user's connections or "friends" in the system 100).

The end user modules 151 also include a location module 155 that facilitates the communication of the end user device 170 with the hardware and software that define the event locations 192. For instance, a geofencing module 156 of the location module 155 may interfaces with the GPS of the end user device 170 and a satellite 196, as depicted in FIG. 5, to allow the system 100 to geolocate the end user device 170 of the end user 178 with the server 110, and specifically the event 182 information stored on the database 180, to know the location of the end user device 170 and associated end user 178, also referred to herein as location data, in relation to the defined geofence of an event location 192. For example, in at least one embodiment, when the end user 178 engages the application program 177 on the end user device 170, the GPS of the end user device 170 will send an electronic signal of its location data to the server 110 through a satellite 196. This electronic signal indicates the position of the associated end user 178. The server 110 or the location module 155 may then compare this end user position data to the event location information for the various events 182 stored on the database 180. If the location data of the end user 178 matches or is within the defined geofence region for a given event 182 (and assuming the other event information also matches, such as date and time), then the end user 178 is considered to be within the event location 192 and the server 110 will send the matching event information to the end user device 170, specifically to the geofencing module 156, to allow the end user 178 to check-in to the event 182. In some embodiments, event check-in occurs automatically once there is a match between end user 178 location information and the event geofence defining the event location 192. This indicates the end user 178 is at the event location 192 and may begin accruing compensation based on the duration of attendance at the event location 192. When the event user 178 is considered to be within the event location 192, the geofencing module 156 creates a timestamp at time t corresponding to the time of check-in.

The geofencing module 156 and/or the location module 155 may also include scripts to execute periodic checks for continued attendance while the application program 177 continues to run on the end user device 170. These periodic checks may occur at any time interval n, such as every 1 minute, 5 minutes, 10 minutes, 1 hour or other intervals. The interval is preferably short enough to provide accurate information on the ongoing location of the end user 178 but also long enough to provide for meaningful accrual of compensation and/or so as not to drain the battery of the end user device 170. In some embodiments, however, the periodic checks may occur continuously and may be as often as milliseconds or microseconds. The periodic checks may involve electronic signals initiated by either the end user device 170, such as from the geofencing module 156, or the server 110, depending on the configuration of the system 100. These signals may also be referred to as "pings" between the end user device 170 and the server 110 and may be unidirectional or bidirectional. Each ping or periodic check at time t+n creates a timestamp corresponding to time t+n if the event user 178 is still within the geofence for the event location 192. There may be any number of successive timestamps for any number of times n. The various timestamps may be used in calculating the compensation, discussed later.

When such a signal indicates the end user device 170 is no longer within the geofence defining the event location 192, this is interpreted as the end user 178 having left the event location 192 and the server 110 may automatically check-out the end user 192 from the event 182. An exit timestamp of the check-out time will also be logged in the database 180 and on the geofencing module 156 of the end user component 150. This exit timestamp may form the basis of a final or absolute amount of compensation the end user 178 may be awarded for attendance at the event 182.

The geofencing module 156 may also record the activity of end users 178 at the event location 192, such as for example how long the end user 178 has been present in an event location 192, which product barcodes may have been scanned by the end user 178 (such as in order to view product details at a store), and whether the end user 178 that scanned the barcodes actually purchased the products. This information may be stored in the database 180 coupled to the information about the event 182.

With reference to FIG. 3, the location module 155 may also include a beacon module 157 configured to receive beacon signals. Beacons 197 emit near field signals such as over Bluetooth, WiFi or other near field range signals whenever they are on or active. The beacon module 157 of the end user device 170 receives these beacon signals when the end user device 170, and therefore end user 178, is within the transmission zone of the beacon 197 or beacon group 198. Accordingly, beacon signals may be considered location data when beacons 197 are used to define the event location 192. These beacon signals may be received through the transceiver 174 of the end user device 170. Upon receiving a beacon signal, the end user device 150 sends an electronic signal indicative of the position of the end user 178 relative to the beacon 197 or beacon group 198 to the server 110, beacon module 157 and/or location module 155, which compares it to information relating to established events 182 stored on the database 180. When the received positional information is within one of the event locations 192, such as may be determined by identification of the beacon 197 detected as one associated with the event 182 or using geolocation to determine the coordinates of the end user device 170 by satellite 196 as shown in FIG. 6, the end user 178 is indicated as being present in the event location 192 and is checked-in to the corresponding event 182. The end user 178 may also manually check-in once presence within the event location 192 is confirmed. Check-in creates an entry timestamp for the end user 178 at that event 182 at time t.

The beacon module 157 is also configured to check for the beacon signal at periodic time intervals n, similar to as described above, and communicate this information to the server 110 and/or location module 155, creating additional successive timestamps at t+n as long as the beacon signals are detected. The time intervals n may be the same as those used in the geofencing module 156, though in at least one embodiment, the beacon module 157 uses shorter time intervals, such as every 1 minute, and may be less than 1 minute such as seconds or fractions of a second. This may be useful since the range on beacons 197 is shorter than that used by geofencing, so more frequent information may be needed to confirm the end user 178 is still within the event location 192. Once the beacon signals are no longer detected, the end user 178 is deemed to have left the event location 192 and an exit timestamp is generated by the beacon module 157.

The end user component 150 also includes a commerce module 158 configured to facilitate the interaction between the end user 178 and an online marketplace. The commerce module 158 may include a compensation module 159 which is configured to award compensation to the end user 178 based on timestamps generated at qualifying events 182. The compensation amount awarded can be any unit of value, such as but not limited to credits, points, tokens, rewards, physical goods or money in any currency or denomination. The compensation module 159 may determine the amount and type of compensation to award an end user 178 according to the compensation rules established for that event 182 by the organizer business user 143 when creating the event 182, which in turn may be based on the particular subscription plan the business user 143 has selected as dictated by the controller 124 of the system 100. As indicated previously, the compensation awarded to the end user 178 is based not only on their attendance at the event 182, but also on how long they remained at the event location 192. This information is determined by the timestamp information, including the entry, exit and/or intervening timestamps t+n accrued during attendance and generated by the relevant module of the location module 155. For instance, in some embodiments, the compensation may be based on the interval of time between the entry and exit timestamps. In other embodiments, the compensation may be based on the interval of time between each intervening timestamp t+n, accruing compensation with each additional timestamp. In some embodiments, the compensation module 159 is also configured to award compensation based on activities performed by the end user 178 while at the event 182, such as by number of media uploads, feed posts, or other similar activities. To award compensation to an end user 178, the compensation module 159 may be configured to create a file indicative of the compensation amount, such as determined by comparing timestamps to the compensation rules or by predefined actions, and to associate this file with the end user's profile.

The commerce module 158 also includes a store module 160 which is configured to facilitate the transmittal of advertisement data and information to end users 178 in a predefined targeted geographical region. The store module 160 may present advertisements 184 to the end user 178 through the display 171 of the end user device 170, for instance. Advertisements 184 may include presenting all advertising occurring nearby, including regular and featured advertisements 184, such as may be near to the end user 178 location or event locations 192. Such presented advertisements 184 include promotional ads, coupons, discounts, vouchers, and all other advertisements 184 that have been established in the system 100 by a vendor business user 143. These advertisements 184 may be associated with a particular event 182 or location 192 or may not be so associated. The store module 160 is further configured to allow the end user 178 to select and "purchase" advertisements 184, such as coupons and vouchers, by redeeming compensation that end user 178 has acquired through the system 100. Each advertisement 184 has an associated redemption amount that corresponds to how much compensation it would cost to "purchase" the advertisement 184. To "purchase" an advertisement 184, the end user 178 selects the advertisement 184 and the store module 160 compares the redemption amount of the advertisement 184 to the total compensation amount associated with the end user's profile. If the end user's total compensation amount is greater than the redemption amount of the advertisement 184, the store module 160 associates that advertisement 184 with the end user's profile and deducts the redemption amount from the end user's compensation amount. The store module 160 may be further configured with search capabilities to enable end users 178 to search for advertisements 184 like coupons, such as by category, vendor, location, compensation value, and online or offline use among others. The store module 160 may also include filter or tracking capabilities to allow an end user 178 to follow or track a particular advertisement 184 for when it may become available.

The commerce module 158 may further include a wallet module 161 that is a ledger for the commerce module 158. For instance, the wallet module 161 may present a compensation ledger to the end user 178 to show them the current balance and transaction history, such as how much compensation they have, of what types, when it was earned, from what event. It may also show what advertisements 184 have been purchased, when, and any pending transactions for advertisements 184. The wallet module 161 may also provide a list of advertisements 184 that have been purchased but are not yet redeemed for products or services, so the end user 178 can see what has yet to be used.

As shown in FIG. 3, the end user component 150 also includes an event module 162 which is in communication with the database 180 and configured to present events 182 to the end user 178. In at least one embodiment, the event module 162 presents events 182 to the end user 178 that are nearby to the end user's current location and the distance range may be selectively adjusted by the end user 178. Events 182 may be presented in a variety of formats, such as calendar format arranged by date and time, map format arranged by location, or list arranged by organizer, category, compensation value, or other aspect of the event 182. The end user 178 may be able to adjust the view in the event module 162. The event module 162 may also include the capability to mark certain events 182 as favorites, which may be helpful with recurring events. It may also include a search function to allow the end user 178 to search for events 182 by any defining characteristic, such as location, organizer, category, compensation value, or other. The end user 178 may also add and save locations and set notifications for events 182 occurring at these locations, which may be useful when the end user 178 travels to the same locations frequently. In some embodiments, the event module 162 may also include a reminder capability to notify the end user 178 of upcoming events 182 for which interest has been indicated. It may also include an RSVP function to communicate to the organizer whether the end user 178 intends to attend the event 182. Reminders may be associated with events 182 for which the end user 178 has provided a positive RSVP response and can be set by the end user 178 for any time increment prior to the event 182, such as 1 hour or 15 minutes for example.

The end user component 150 may also include a friends module 163 which is configured to allow the end user 178 to engage with other end users 178 of the system 100. For instance, the friends module 163 is in communication with the server 110 to allow end users 178 to perform a number of activities, including but not limited to: send and receive friend requests from other end users 178; follow other end users 178 who have been designated as friends; see designated friends' profiles; follow, block and unfollow existing designated friends; chat with end users 178 designated as friends; see which friends are nearby; and invite friends to events 182. Friends may be designated by mutual agreement of both end users 178.

The end user component 150 may also include a feed module 164 configured to enable a social media type interaction among end users 178. In at least one embodiment, the feed module 164 is entirely internal to the system 100 and only participating end user 178 can see and access the feed. In other embodiments, the feed module 164 may link with existing social media accounts of the end user 178 external to the system 100, such as but not limited to Instagram and Facebook. The feed module 164 allows an end user 178 to post text, images, photos, GIFs and other media to the system 100 for presentation to other end users 178 on their own end user device 170. Accordingly, the feed module 164 may be in communication with various I/O components of the end user device 170, such as keyboard, touchpad, camera and microphone, at least when the feed module 164 is being accessed. These posts may be public, visible to all end users 178 of the system 100, or private, limited to only those end users 178 designated as friends within the system 100. The feed module 164 may also be configured to enable end users 178 to comment on, like and share others' posts on the feed. In at least one embodiment, the feed module 164 may limit end users' 178 ability to post to the feed module 164 to only those times when the end user 178 is present at an event location 192 and attending an event 182. Accordingly, the feed module 164 may be in communication with the location module 155 to confirm event presence, at least when the feed module 164 is active. In other embodiments, the feed module 164 may enable feed posts from any time and location.

As described herein, the various end user modules 151 may be in communication with one another when the end user device 170 is in use participating in the system 100, such as when it is in communication with the end user component 150, server 110 and/or database 180 and its contents. This may occur whenever the application program 177 on the end user device 170 is enabled, such as opened and is running.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents, including all combinations and subcombinations of the embodiments described herein, and of the manner and process of making and using them.

Now that the invention has been described.

What is claimed is:

1. A system for providing compensation to an end user in a defined location, the system comprising:
   a database configured to receive and store data;
   an event creation module in electronic communication with said database and a business user device associated with a business user, said event creation module configured to enable said business user to create an event defined by event data stored in said database, said event data including a date, time, event location and compensation rule, wherein said event location is defined as an area within one of a geofence and a transmission zone of at least one beacon, and wherein said compensation rule is defined by an interval of time, a corresponding compensation type and a corresponding value of compensation;
   a group creation module configured to allow said business user device to define at least one of: (i) a private group comprising pre-identified end users specific to said event, and (ii) a beacon group comprising a plurality of identified beacons collectively defined as said beacon group; and wherein said event creation module is further configured to restrict said event to said private group or said beacon group when selected;
   a location module in electronic communication with said database and an end user device associated with said end user having an end user profile, said location module configured to:
   (i) receive an electronic signal from said end user device indicative of a position of said end user,
   (ii) electronically compare said position of said end user to said event location, and
   (iii) create a plurality of timestamps indicating times said position of said end user corresponds to within said event location during said event; and
   a compensation module in electronic communication with said location module and said database, said compensation module configured to:
   (a) receive said plurality of timestamps from said location module, (b) determine an interval of time corresponding to a duration of time defined between two of said timestamps, said duration of time indicative of an amount of time said end user is positioned within said event location during said event, and
(c) determine a compensation amount due to said end user calculated by application of said compensation rule to said interval of time.

2. The system as recited in claim 1, wherein said compensation rule is one of a plurality of compensation rules each defined by different ones of said interval of time, said corresponding compensation type and said corresponding value unit of compensation;
wherein said interval of time is one of: 1 minute, 5 minutes, 10 minutes, 15 minutes, 20 minutes, 30 minutes, 1 hour, 1 day and 1 week;
wherein compensation type is one of credits, points, tokens, rewards, goods and money; and
wherein said value unit of compensation is one of: 1, 5, 10, 15, 20, 25, 50, 75, 100, 150, 200, 250, 300, 350, 400, 450, 500, 1000 and 5000.

3. The system as recited in claim 2, wherein said event creation module is configured to enable said business user to select one of said plurality of compensation rules to associate with said event.

4. The system as recited in claim 1, wherein said compensation module is further configured to create and associate a file indicative of said compensation amount with said end user profile.

5. The system as recited in claim 1, further comprising a subscription module configured to (i) provide at least one subscription plan each corresponding to at least one of a plurality of compensation rules, and (ii) permit said business user to select one of said at least one subscription plan.

6. The system as recited in claim 5, wherein said event creation module further configured to allow said business user to create said event with said compensation rule corresponding to said selected subscription plan.

7. The system as recited in claim 1, further comprising an advertising creation module in electronic communication with said business user device associated with said business user, wherein said business user is a vendor, and said advertising creation module is configured to enable said business user to create at least one advertisement having a redemption amount presentable to said end user.

8. The system as recited in claim 7, wherein said at least one advertisement is one of promotional material, a coupon, a discount and a voucher, relating to one of a product and service.

9. The system as recited in claim 7, further comprising a store module in communication with said end user device and said compensation module, said store module configured to (i) present said at least one advertisement to said end user; (ii) enable said end user to select one of said at least one advertisement; (iii) compare said redemption amount of said selected advertisement to a total of said compensation amount associated with said end user profile; and (iv) associate said selected advertisement to said end user profile and correspondingly reduce said compensation amount associated with said end user profile by said redemption amount when said total compensation exceeds said redemption amount of said selected advertisement.

10. The system as recited in claim 7, further comprising a subscription module configured to (i) provide at least one vendor subscription plan each corresponding to at least one of a plurality of said advertisements and said redemption amounts, and (ii) permit said business user to select one of said at least one vendor subscription plan, wherein said advertising creation module is further configured to allow said vendor business user to create said advertisement corresponding to said selected vendor subscription plan.

11. The system as recited in claim 1, further comprising an events module in communication with said event and configured to present available events to said end user.

12. The system as recited in claim 1, further comprising a friends module configured to enable end users to connect to other end users.

13. The system as recited in claim 1, further comprising a feed module configured to allow said end user to communicate with other ones of a plurality of end users through respective associated ones of said end user devices.

14. The system as recited in claim 1, wherein said end user device utilizes a downloadable program to access said system.

15. The system as recited in claim 1, wherein said business user device utilizes a site to access said system.

16. The system as recited in claim 1, wherein said location module is further configured to: (i) receive successive electronic signals from said end user device indicative of a successive position of said end user at time t+n, (ii) compare said successive electronic signals of said successive position of said end user to said event location, and (iii) create successive timestamps corresponding to time t+n when said successive position of said end user corresponds to within said event location, where n is an interval of time.

17. The system as recited in claim 16, wherein said compensation module is further configured to determine said interval of time between said successive positions of said end user and determine said compensation amount due to said end user calculated by application of said compensation rule with respect to said interval of time between one of (i) each said successive timestamp and (ii) the most recent said successive timestamp and an initial one of said timestamps.

18. The system as recited in claim 16, wherein n is determined by one of said end user device, said geofence, and said at least one beacon.

* * * * *